United States Patent [19]

Rosenthal et al.

[11] 4,055,629

[45] Oct. 25, 1977

[54] PROCESS FOR THE REMOVAL OF SELENIUM COMPOUNDS FROM URETHANE SOLUTIONS

[75] Inventors: Rudolph Rosenthal, Broomall; Edward T. Shawl, Wallingford, both of Pa.

[73] Assignee: Atlantic Richfield Company, Los Angeles, Calif.

[21] Appl. No.: 750,109

[22] Filed: Dec. 13, 1976

[51] Int. Cl.$^2$ .......................... C01B 19/00; C01G 3/02
[52] U.S. Cl. ..................................... 423/509; 423/604
[58] Field of Search ................ 423/508, 509, 510, 604

[56] References Cited

U.S. PATENT DOCUMENTS

| | | | |
|---|---|---|---|
| 2,084,394 | 6/1937 | Heberlein | 423/509 X |
| 3,627,486 | 12/1971 | Nakano | 423/509 |
| 3,848,069 | 11/1974 | Carey et al. | 423/508 |

FOREIGN PATENT DOCUMENTS

| | | | |
|---|---|---|---|
| 460,226 | 10/1949 | Canada | 423/510 |

*Primary Examiner*—Edward Stern
*Attorney, Agent, or Firm*—Delbert E. McCaslin

[57] ABSTRACT

A process for the recovery of selenium from a urethane solution containing selenium compounds which comprises contacting the selenium-containing urethane solution at a suitable temperature with copper (I) chloride, oxygen or an oxygen-containing gas such as air, and a complexing solvent such as an amine or nitrile to form an insoluble precipitate of copper-selenium compounds or complexes. The selenium and copper may be recovered from the resulting precipitate in a form suitable for reuse in the preparation of urethanes and selenium removal respectively.

12 Claims, No Drawings

PROCESS FOR THE REMOVAL OF SELENIUM COMPOUNDS FROM URETHANE SOLUTIONS

BACKGROUND OF THE INVENTION

In U.S. Pat. No. 3,895,054 there is disclosed a process for the manufacture of urethanes (carbamic acid esters by reaction an organic compound containing at least one hydroxyl group, e.g. ethyl alcohol, with carbon monoxide and a nitrogenous organic compound at elevated temperature and pressure in the presence of a selenium catalyst and a base and/or water.

The present invention is directed to a simple and effective method of recovering the selenium from urethane solutions produced, for example, by the above described process and containing selenium which may be in the form of selenium per se, inorganic selenium compounds and organoselenium compounds. Because of the high reactivity of selenium, when used as a catalyst as in the above reaction, its combination with organic compounds very frequently results in the formation of organoselenium compounds, such as benzoselenazol and diethyl diselenide, which remain in solution with the urethane reaction product. In such reaction, a portion of the selenium catalyst such as selenium per se or selenium dioxide, selenium disulfide, selenium oxychloride, etc. is converted to one or more organoselenium compounds which may be classified generally as selenols, selenides, benzoselenazoles, esters of selenocarbonic acid, selenic acid and selenious acid, selenones and the like. The type and number of organoselenium compounds which may be formed is a function of the reaction conditions used to product the urethanes such as time, temperature, pressure and solvent. In addition, the inorganic selenium compounds used as catalysts or formed in the reaction may also remain in solution with the urethane product.

Because of the cost and toxicity of selenium, it is essential that as much of the selenium be recovered from the urethane reaction product as is possible and from the inorganic or organoselenium compounds in a form suitable for reuse as a catalyst.

Prior art processes have been proposed for the recovery of selenium from certain organic reaction products and aqueous or acidic solutions. However, such prior art processes are generally narrow in scope and application and have proven to be of little or no value to the recovery of selenium from urethane solutions containing same.

In an article by H. Hauptmann and W. F. Walter, Journal of Americal Chemical Society, Vol. 77, pp. 4929-4930, Sept. 20, 1955 the action of Raney nickel on organoselenium compounds to effect deselenization is described. A large excess of the Raney nickel is necessary accompanied by long reaction times resulting in partial deselenization.

U.S. Pat. No. 3,577,216 relates to a process for the recovery of selenium IV used as a catalyst in the oxidative production of carboxylic acids by adding to the reaction products magnesium, zinc, aluminum, alkali and alkaline earth metal hydroxide, oxides, carbonates, bicarbonates and salts of the metals to precipitate metal selenite and reacting the metal selenite with a strong inorganic acid solution to obtain one of selenious acid and anhydride.

U.S. Pat. No. 3,048,604 discloses a deselenation of dehydrosteroids containing selenium by reaction of the contained selenium compound with copper powder at temperatures of from 100° C. to 300° C.

U.S. Pat. No. 3,084,994 discloses a method together with aldehydes and nitriles using water sprays to collect the selenium and atomizing the selenium-containing water in the molecular oxygen-containing gas in contact with an oxide of copper, iron or nickel at 500° C. to convert the selenium in the water solution to selenium dioxide.

SUMMARY OF THE INVENTION

This invention relates to a process for the recovery of selenium from organic solutions containing inorganic and/or organic selenium compounds or mixtures thereof. More specifically, the present invention concerns a process for the formation and removal of selenium in the form of copper-selenium compounds or complexes from an effluent solution obtained from the selenium catalyzed conversion of an organic nitrocompound to produce a urethane as described for example in the aforementioned U.S. Pat. No. 3,895,054 and incorporated herein by reference. The urethane products produced by such process, which may contain one or more organoselenium compounds as well as metallic selenium and/or inorganic selenium compounds, is contacted in the liquid phase with copper (I) chloride, i.e., CuCl and $Cu_2Cl_2$, oxygen or an oxygen-containing gas such as air, and an amine or nitrile complexing solvent, to form an insoluble copper-selenium compound or complex as a precipitate without affecting the urethane product and minimizing any loss of the urethane while substantially removing selenium compounds. By such process of the invention, selenium compounds are removed from the urethane solution as copper-selenium compounds or complexes by for example, filtration of the precipitate from solution. The selenium so recovered may be separated from the copper-selenium compound or complex, as hereinafter described, in a form suitable for reuse in the urethane synthesis reaction.

An advantage provided by the process of the present invention, as compared to known selenium removal processes, is the relative simplicity of adding a copper (I) chloride and an appropriate amine or nitrile along with air or oxygen, to the urethane reaction product and thereby form an insoluble copper-selenium compound or complex with the contained selenium, which compound or complex may be readily removed from the solution by for example filtration and further treated to separate the selenium and copper for further use.

It is an object of this invention to provide a process for the substantial recovery of valuable selenium from selenium-containing urethane solutions and the ultimate purification of the urethane.

It is another object of this invention to provide a process for the recovery of selenium in a form suitable for recycle and reuse as a catalyst for the synthesis of urethanes from an organic compound containing at least one hydroxyl group with carbon monoxide and a nitrogenous organic compound.

It is a further object of this invention to recover contained selenium values from urethane solutions utilizing copper (I) chloride, an amine or nitrile, and oxygen or oxygen-containing gas to form a compound or complex with the selenium compounds and to recover the copper and selenium from the compound or complex in a form suitable for recycle and reuse.

These and other objects and advantages of this invention will become apparent from the description of the invention which follows and from the claims.

DESCRIPTION OF THE INVENTION

In accordance with the present invention, a urethane solution containing selenium or compounds thereof, as for example, a urethane solution obtained by reacting an organic compound containing at least one hydroxyl group with carbon monoxide and an organic nitrogenous compound containing at least one non-cyclic group, in which a nitrogen atom is directly attached to a single carbon atom and is also attached through a double bond to an oxygen or nitrogen atom, at elevated temperatures and pressures in the presence of a metallic selenium or selenium compound catalyst and a base and/or water, is subjected to a treatment with copper (I) chloride, an amine or nitrile complexing solvent and oxygen or an oxygen-containing gas such as air, to form compounds or complexes with the selenium compounds contained in the urethane, at temperatures of from about ambient to about 150° C. and at low pressures of air or oxygen to precipitate and remove selenium compounds from the solution to provide an essentially deselenized urethane solution and to recover the valuable selenium.

The amount and type of selenium compounds in the crude urethane reaction product will generally depend on the type and amount of selenium compound, including selenium per se, employed to produce the urethane as well as the reaction conditions and urethane being produced. Thus, the amount of selenium in the form of selenium per se, inorganic selenium compounds or organoselenium compounds, may range from ½ to 5 percent but will generally be from 1 to 3 percent by weight of the urethane solution produced, for example, by the process as set forth in U.S. Pat. No. 3,895,054.

The selenium-containing urethane solutions may be contacted with the copper (I) chloride, amine or nitrile solvent and air and/or oxygen by batch, semi-continuous or continuous process methods. For example, an amine or nitrile solution with copper (I) chloride may be added to the crude urethane solution heated to the proper temperature and air passed through the solution. The insoluble copper-selenium compounds or complex which is formed is separated by any suitable means, such as filtering or centrifuging. The selenium-containing crude urethane solution may also be passed through a copper (I) chloride and amine, or nitrile solvent solution through with air and/or oxygen is being passed and through a filtering device, and the essentially selenium free effluent urethane recovered leaving the retained copper-selenium compound or complex for further processing and separation of the selenium and if desired the copper. Batch or semicontinuous methods are preferred to facilitate the separation of the insoluble copper-selenium compound or complex from the essentially deselenized urethane.

The choice of copper (I) chloride for use in the process of this invention is critical since it has been found that other copper salts are relatively ineffective in removing selenium compounds from urethane solutions with or without the presence of an amine or nitrile and the addition of air or oxygen. While other copper (I) salts such as copper (I) iodide and copper (I) acetate did show some activity for selenium removal, temperatures outside the preferred operating range were required, which generally resulted in a loss of urethane product. Copper salts in the plus two oxidation state such as copper (II) chloride showed very little, if any, activity for the removal of selenium compounds. The copper (I) chloride employed along with an amine or nitrile, air or oxygen is added to the crude urethane reaction product at a weight ratio of copper to contained selenium of about 1:10 and preferably at a ratio of about 3:5.

Suitable amines which may be used in the process of the invention include alkyl, aryl and aralkyl primary, secondary and tertiary amines which are essentially non-reactive with the urethane at the reaction temperatures employed. A large number and variety of amines may be employed as complexing solvents for the selenium removal according to this invention, but practical considerations such as cost and availability often limits the selection. Representative amines especially suitable for use in this invention are, for example, pyridine, 4-methylpyridine, triethylamine, quinoline, morpholine, 1,4-diaza-bicyclo2,2,2octane, ethylenediamine, 1,3-propane-diamine, benzylamine, diethylenetriamine, diethylamine, aniline, butylamine, N,N-diethylaniline and the like. Those amines which may react with the product urethane, e.g., primary and secondary amines, especially at the higher reaction temperatures of about 110° C. to 150° C. present somewhat of a problem and are to be avoided. For this reason tertiary amines are preferred with triethylamine and pyridine especially preferred.

Suitable nitriles which may be employed in the process of the invention include both alkyl, aryl and substituted aryl nitrides which are generally non-reactive with the urethane at reaction conditions. Representative nitriles especially suitable include, for example, acetonitrile, propionitrile, benzonitrile, 4-methylbenzonitrile, and the like, with acetontrile and benzonitrile being preferred.

The amount of amine or nitrile employed as complexing solvent may be from about 5 to about 50 parts by weight and preferably from 10 to 25 parts by weight based on the total solution being treated. The amine or nitrile employed, after precipitation and removal of the copper-selenium compounds or complexes, remain with the deselenized urethane solution and may be removed for reuse along with other hydrocarbon solvents by distillation. Mixtures of amines, and mixtures of nitriles as well as mixtures of amines and nitriles may be employed in the process.

The selenium removal reaction of the invention must be carried out in the presence of oxygen. Oxygen or an oxygen-containing gas such as air or oxygen diluted with an inert gas such as nitrogen may be employed. When air is employed, generally a pressure of about one atmosphere is satisfactory along with adequate gas liquid mixing. However, higher pressures may be used. In general, oxygen pressures of from about 0.1 atmosphere to about 5 atmospheres are employed, although higher or lower pressures may be used if desirable, e.g., at higher or lower reaction temperatures.

The process of the invention may be carried out at temperatures of from ambient temperature up to about 150° C. although temperatures in the range of from about 50° C. to 150° C. and preferably from about 80° C. to 110° C. are generally employed. Generally, the temperature will be dependent on the selenium compounds to be reacted and removed as well as the thermal stability of the product urethane.

The selenium compound removal reaction of the invention is conducted in the liquid phase. Often the crude selenium-containing effluent urethane solution, prepared using an amine base, may be contacted directly with copper (I) chloride, additional amine, if necessary, and oxygen or, if desirable, a solvent or mixture of solvents which are inert at the process conditions used, may be employed. The crude urethane reaction effluent obtained from the selenium catalyzed reaction as set forth in U.S. Pat. No. 3,895,054 contains in addition to the urethane product (carbamate), some related products, alcohol, a base such as an amine or potassium acetate, various selenium compounds and selenium per se, and reaction solvents.

The crude urethane effluent solution which as indicated above may be contacted directly with the copper (I) chloride, a complexing amine or nitrile and oxygen or an oxygen-containing gas, is preferably distilled to remove contained alcohol, e.g., ethyl alcohol, reaction solvents, and any amine base and/or water which may be present, which materials are replaced or exchanged by an essentially inert water insoluble aromatic hydrocarbon, such as xylene, leaving a hydrocarbon solution containing urethanes, selenium compounds, and any unreacted nitrogenous compounds. When metal salts of carboxylic acids, sulfonic acids and phosphoric acids are used as the base by the process of U.S. Pat. No. 3,895,054 they are of course not distilled off but precipitate upon the addition of the aromatic hydrocarbon and may be removed by, for example, filtration. The hydrocarbon/urethane/selenium solution which is formed is then subjected to treatment, at a suitable temperature, with copper (I) chloride, oxygen and a complexing amine or nitrile to form an insoluble copper-selenium compound or complex precipitate which may readily be removed from solution to provide an essentially deselenized urethane solution and to recover the valuable selenium.

The distillation of the crude effluent urethane solution to strip off unreacted alcohol, any reaction solvent, and any amine base and/or water may be carried out under subatmospheric or atmospheric pressures at temperatures of from about ambient temperatures to 200° C. and preferably from about 50° C. to 150° C. The alcohols and amine bases may be stripped from the crude urethane solution leaving a residue of urethanes containing selenium compounds and possibly unreacted nitrogenous compounds such as 2,4-dinitrotoluene, which is then dissolved in aromatic hydrocarbon, or the alcohol and amine may be exchanged with the hydrocarbon during distillation so long as the hydrocarbon has a higher boiling point than the alcohols and amine base being removed. After addition of the aromatic hydrocarbon other bases, e.g., potassium acetate, which precipitate from solution may be filtered off leaving a hydrocarbon/urethane/selenium solution.

The essentially inert water insoluble aromatic hydrocarbons, or mixtures thereof, which may be employed to form the hydrocarbon/urethane/selenium solution may be benzene and the alkyl and/or halogen substituted benzene derivatives such as, for example, benzene, xylenes, toluene, ethylbenzene, trimethylbenzene, dichlorobenzene, dibromobenzene, etc. The preferred hydrocarbons are benzene, xylenes and toluene.

While, as indicated, mixtures of the hydrocarbons may be employed, it is preferable to use individual hydrocarbons in order to lessen any recovery problem.

Contact (reaction) time of the copper (I) chloride, amine or nitrile complexing solvent and oxygen or air with the selenium-containing urethane solution, to permit the precipitate copper-selenium compound or complex to form may vary within a range of from a few minutes to several hours depending on the selenium compound or compounds in the crude urethane to be reacted and removed and the temperature employed. Generally, the contact time will range between 5 minutes and 1 hour.

Once the copper-selenium compound or complex precipitate has been removed from the urethane solution, for example, by filtration it may be treated in a number of ways to recover the copper as well as the selenium in catalytically useful form. A suitable method for recovery of the selenium and copper from the compound or complex is to convert the selenium and copper in the presence of air or oxygen, to selenium dioxide and copper oxide respectively at temperatures of from about 300° C. to 650° C., recovering the $SeO_2$ from the effluent reactor stream by cooling to below the sublimitation point of $SeO_2$ (approx. 300° C.) to collect the $SeO_2$ and recovering the remaining CuO.

Selenium per se, which may also be present in the crude urethane reaction product, may be readily recovered, preferably by bubbling air through the crude urethane solution to precipitate and essentially remove by filtration the contained elemental selenium. The selenium per se may also be precipitated from the treated solution.

Although the process of the present invention will be directed to the treatment and recovery of selenium compounds from the crude urethane which is a diethyltoluene-2,4-dicarbamate (diurethane) solution containing selenium compounds and produced by the process of U.S. Pat. No. 3,895,054 it is not intended that the process be limited to such carbamate solution and those skilled in the art will recognize that the present process is broadly applicable to the treatment of other urethanes such as methyl N-phenyl carbamate, diethyltoluene-2,6-dicarbamate, dibutyl toluene-2,4-dicarbamate, etc. which have been prepared, for example, by the selenium catalyzed process as described in U.S. Pat. No. 3,895,054.

The following Examples are provided to illustrate the recovery of selenium compounds from a urethane solution in accordance with the principles of this invention but are not to be construed as limiting the invention in anyway except as indicated by the claims.

In the Examples which follow the diethyltoluene-2,4-dicarbamate (diurethane) solutions were obtained by taking the effluent from a elemental catalyst reaction of ethyl alcohol with carbon monoxide and 2,4-dinitrotoluene at elevated temperature and pressure in the presence of an amine base as described in U.S. Pat. No. 3,895,054.

In Example 1 a crude reactor effluent diurethane was employed. The selenium-containing urethane solutions used in Examples 2-15 were obtained by taking the same crude diurethane reaction product which contained unreacted 2,4-nitrotoluene, unreacted ethanol, a triethylamine/pyridine base mixture and a mixture of elemental selenium and various organoselenium compounds. Air was bubbled through the solution and filtered to remove elemental selenium and the filtrate distilled with addition of xylene until ethanol and the amines were removed. In this manner two solutions were obtained with the following identifications and concentrations of selenium and diurethane: Solutions SRC-3B, 0.246 weight percent selenium, 11.66 weight percent diurethane and Solution J-1, 0.348 weight percent selenium, 11.48 weight percent diurethane. Each solution was approximately 88 weight percent xylene. At these diurethane concentrations complete solubility was obtained by heating the solutions to 40°–50° C. Selenium compound removal reactions were run in a 250 ml. three neck flask fitted with a thermometer, reflux condenser and air inlet tube extending below the liquid level. The reactants were charged to the flask, stirred with a magnetic stirrer and heated to the desired temperature for the specified reaction time. The solutions were cooled, filtered and the selenium remaining in solution determined by X-ray Fluorescence. The deselenized solution was subjected to high speed liquid chromatographic analysis to determined urethane content.

EXAMPLE 1

50 ml. of a crude selenium containing diethyltoluene-2,4-dicarbamate solution containing approximately 7 percent ethanol, 48 percent diethyltoluene-2,4-dicarbamate and related products, 24 percent triethylamine-19 percent pyridine mixture, 1.38 percent selenium as unreacted elemental selenium and unidentified inorganic and organoselenium compounds, and unreacted 2,4-dinitrotoluene was contacted directly with stirring at a temperature of 90° C. for 1 hour with 1.0 g. of copper (I) chloride while passing 100 ml/min. air through the solution. The resulting precipitate was filtered and analyzed by x-ray showing 59.3 percent selenium removal. 100 percent of the diurethane was recovered.

EXAMPLE 2 (Comparative)

50 g. of xylene solution SRC-3B containing 0.123 g. selenium and 5.83 g. diurethane was charged to the reaction flask along with 50 g. pyridine and 1.0 g. copper (I) chloride. The solution was heated with stirring to 80° C. for one hour under an atmosphere of nitrogen. After workup a total of 10.2 percent selenium was removed and diurethane recovery was complete.

EXAMPLE 3

Example 2 was repeated by replacing the nitrogen atmosphere with a stream of air passed through the solution at a rate of 100 ml per minute. A total of 61.7 percent of the selenium was removed and 97.7 percent of the diurethane was recovered.

EXAMPLE 4 (Comparative)

Example 3 was repeated with the exception that copper (I) chloride was not added to the reaction flask. Only 6.2 percent of the selenium was removed after workup.

EXAMPLE 5 (Comparative)

50 g. of xylene solution SRC-3B was charged to the reaction flask along with 50 g. pyridine and 1.0 g. copper (II) chloride. The solution was heated with stirring to 80° C. for one hour in an atmosphere of air. On workup it was found that only 3.2 percent of the selenium was removed.

EXAMPLE 6 (Comparative)

Example 3 was repeated with the exception that pyridine was excluded from the reaction mixture. A total of 10.5 percent of the selenium was removed.

The following examples demonstrate the use of other amines and nitriles as complexing solvents along with the copper (I) chloride and air.

EXAMPLE 7

50 g. of xylene solution J-1 containing 0.174 g. selenium and 5.74 g. of diurethane was charged to the reaction flask along with 1.0 g. copper (I) chloride and 10 g. benzonitrile. Air at 100 ml/min. was passed through the solution which was heated to 80° C. for 1 hour with stirring. X-ray analysis of the precipitate indicated that the selenium removal amounted to 51.9 percent of the charge. Approximately 100 percent of the diurethane was recovered.

EXAMPLE 8

50 g. of xylene solution J-1 along with 1.0 g. copper (I) chloride and 10 g. acetonitrile were charged to the reaction flask. Air at 100 ml/min. was passed through the solution which was heated to 50° C. for 1 hour with stirring. A total of 42.7 percent of the selenium was removed. Essentially 100 percent of the diurethane product was recovered.

EXAMPLE 9

Example 7 was repeated with the exception that 10 g. triethylamine was used in place of the benzonitrile. Of the selenium charged 66.0 percent was removed. The recovery of diurethane was 96.7 percent.

EXAMPLE 10

50 g. of xylene solution J-1 was charged to the reaction flask along with 10 g. of ethylene diamine and 1.0 g. copper (I) chloride. The solution was heated to 110° C. with stirring while passing oxygen at 20 ml/min. through the solution. X-ray analysis of the solution after removal of the precipitate showed 57.6 percent of the selenium was removed.

EXAMPLE 11

50 g. of xylene solution J-1 was charged to the reaction flask along with 1.4 g. copper (I) chloride and 5 g. pyridine. After heating in 100 ml/min. air for 1 hour at 110° C. the precipitate was filtered off and analyzed showing that a total of 77 percent of the selenium was removed. Diurethane recovery was 98 percent.

EXAMPLE 12

To the reaction flask were charged 50 g. xylene solution SRC-3B, 50 g. pyridine and 2.0 g. copper (I) chloride. The reaction was run for 2 hours at 80° C. with stirring in 100 ml/min. of air. 63.2 percent of the selenium was removed. The diurethane recovery was 91 percent.

EXAMPLE 13

To the reaction flask was charged 50 g. of xylene solution SRC-3B, 50 g. pyridine and 1.0 g. copper (I) chloride. The solution was heated, while passing air through the solution at 100 ml/min., to 80° C. for 15 minutes. X-ray analysis indicated that a total of 45.8 percent of the selenium was removed. The diurethane recovery was 98.1 percent.

EXAMPLE 14

The reaction flask was charged with 50 g. of xylene solution SRC-3B, 50 g. pyridine and 1.0 g. copper (I) chloride. The solution was heated to 50° C. while passing air through the solution for 1 hour. Of the selenium charged 61.5 percent was removed. The diurethane recovery was 95.7 percent.

EXAMPLE 15

The reaction flask was charged with 50 g. of xylene solution J-1, 50 g. pyridine and 1.4 g. copper (I) chloride. The solution was heated to 90° C. for 1 hour while passing air through the solution at 100 ml/min. At the end of one hour an additional 0.7 g. copper (I) chloride was added and the air and heating continued another hour. At the end of the reaction 81.4 percent of the selenium had been removed. Essentially 100 percent of the diurethane was recovered.

We claim:

1. A process for the recovery of selenium from selenium-containing urethane solutions derived from the selenium catalyzed reaction of an organic compound containing at least one hydroxyl group with carbon monoxide and a nitrogenous organic compound at elevated temperatures and pressures in the presence of a base and/or water, which comprises the steps of:
    contacting the selenium-containing urethane solution at a temperature in the range of from about ambient to about 150° C. with copper (I) chloride at a weight ratio of copper to contained selenium of about 1:10, from about 5 to about 50 parts by weight based on urethane solution treated of an alkyl, aryl or aralkyl amine or alkyl, aryl or substituted aryl nitrile complexing solvent, and oxygen or an oxygen-containing gas at a pressure of from about 0.1 to about 5 atmospheres to form an insoluble copper-selenium compound or complex precipitate in solution;
    separating the insoluble precipitated compound or complex from the solution;
    treating said insoluble copper-selenium compound or complex with air or oxygen at a temperature of from about 300° C. to 650° C. to convert the selenium to selenium dioxide and the copper to copper oxide to separate selenium and copper; and
    recovering said copper oxide and selenium dioxide.

2. A process according to claim 1 wherein the ratio of copper to contained selenium employed is about 3:5.

3. A process according to claim 1 wherein the selenium-containing urethane solution is contacted at a temperature in the range of from about 80° C. to 110° C.

4. A process according to claim 1 wherein the complexing solvent is in the range of from about 10 to about 25 parts by weight.

5. A process according to claim 1 wherein the amine is a tertiary amine.

6. A process according to claim 1 wherein the amine is selected from the group consisting of triethylamine, pyridine and ethylenediamine.

7. A process according to claim 1 wherein the nitrile is acetonitrile or benzonitrile.

8. A process according to claim 1 wherein an essentially inert water insoluble solvent is added to the selenium-containing urethane prior to contact with the copper (I) chloride, amine or nitrile, and oxygen or oxygen-containing gas.

9. A process according to claim 8 wherein the solvent is selected from benzene, xylene or toluene.

10. A process according to claim 9 wherein the solvent is xylene.

11. A process according to claim 1 wherein the copper-selenium compound or complex is separated from solution by filtration.

12. A process for the recovery of selenium from a selenium-containing diethyl toluene-2,4-dicarbamate solution derived from the selenium catalyzed reaction of ethyl alcohol with carbon monoxide and 2,4-dinitrotoluene at elevated temperature and pressure in the presence of a base and/or water which comprises the steps of:
    contacting the selenium-containing diethyltoluene-2,4-dicarbamate solution at a temperature in the range of from about ambient to about 150° C. with copper (I) chloride at a weight ratio of copper to contained selenium of about 1:10, from about 5 to about 50 parts by weight based on urethane solution treated of an amine or nitrile complexing solvent, and oxygen or an oxygen-containing gas at a pressure of from about 0.1 to about 5 atmospheres to form an insoluble copper-selenium compound or complex precipitate in solution;
    separating the insoluble precipitated compound or complex from the solution;
    treating said insoluble copper-selenium compound or complex with air or oxygen at a temperature of from about 300° C. to 650° C. to convert the selenium to selenium dioxide and the copper to copper oxide to separate selenium and copper; and
    recovering said copper oxide and selenium dioxide.

* * * * *